United States Patent [19]

McEvoy

[11] 4,405,681
[45] Sep. 20, 1983

[54] FOAM ARTICLE AND METHOD OF PREPARATION

[75] Inventor: James T. McEvoy, Oak Creek, Wis.

[73] Assignee: Milsco Manufacturing Company, Milwaukee, Wis.

[21] Appl. No.: 459,370

[22] Filed: Jan. 20, 1983

[51] Int. Cl.³ .......................... B32B 3/26; B32B 5/14; B32B 5/20
[52] U.S. Cl. ............................... 428/309.9; 264/46.4; 264/46.6; 428/316.6
[58] Field of Search .......................... 264/46.4, 46.6; 428/309.9, 316.6

[56] References Cited

U.S. PATENT DOCUMENTS

| | | | |
|---|---|---|---|
| 3,141,206 | 7/1964 | Stephens | 428/316.6 |
| 3,520,769 | 7/1970 | Baker | 428/316.6 |
| 4,190,697 | 2/1980 | Ahrens | 264/46.4 |
| 4,385,090 | 5/1983 | Sims | 428/316.6 |

Primary Examiner—William J. Van Balen
Attorney, Agent, or Firm—James E. Nilles

[57] ABSTRACT

A foam article suitable for use as a seat cushion includes a supportive bottom layer of firm high density foam, a comfortable top layer of soft low density foam and a border or side wall of foam of intermediate density. The foam article has a sag factor of about 4.5 to about 6.5, and the foam layers and the side wall are bonded together without employing adhesives. A method of preparing the foam article also is disclosed.

7 Claims, 8 Drawing Figures

FOAM ARTICLE AND METHOD OF PREPARATION

The present invention relates to a novel foam article especially useful as a seat cushion and to a method of preparing such an article.

BACKGROUND OF THE INVENTION

In the past, various methods have been used to make foam cushions which provide both support as well as a soft, comfortable seat. The methods of preparing such cushions for the most part have involved the bonding together with adhesives of different types of foams and/or foams of different hardnesses to form a laminated cushion having the desired properties. Such methods are effective, but they are time consuming and relatively expensive.

In the Ahrens U.S. Pat. No. 4,190,697, a method is disclosed for producing a multidensity foam article suitable for use as a seat cushion without using adhesives. In the patented method, a foam cushion having a firm, high density foam bottom layer and a soft, low density foam top layer is prepared by placing a first formulation capable of yielding a firm foam into a mold, permitting said formulation to start rising and foaming, pouring a second liquid formulation capable of forming a soft foam through the rising first formulation so that the first formulation floats upon the second formulation, and then permitting the two formulations to foam, rise and cure into a multidensity foam article in which the foam layers of different density are bonded and knitted together at their common boundaries.

SUMMARY OF THE INVENTION

It is an object of the present invention to disclose a multidensity foam article having a sag factor of about 4.5 or greater which is suitable for use as a seat cushion for upholstered furniture, office furniture or vehicle seats.

It is a further object to disclose a method of preparing such a multidensity foam article without using adhesives.

The multidensity foam article of the present invention which has a sag factor of about 4.5 or greater is comprised of foams of different densities. The article includes a firm, supportive bottom layer of high density, high modulus foam, a top layer of lower density, lower modulus, soft foam and a border or supportive side wall of foam. The foam top, bottom and side wall are bonded or knitted together without the use of adhesives.

The present invention also relates to a method of preparing the three component foam article which comprises placing in the center of a mold a first formulation which yields a firm foam having a high density, placing around the periphery of the first formulation in the mold a border of a second formulation which yields a foam of medium density, allowing the two formulations to foam and start to rise and then pouring through the first formulation a third formulation which yields a foam of low density. The third formulation is a liquid and of higher specific gravity than the foaming first and second formulation so that at least the foaming first formulation floats upon the third formulation. The three formulations are then allowed to cream, foam and rise to fill the closed mold. When sufficiently cured, the article is removed from the mold. It is inverted 180° for use as a cushion having a soft, comfortable foam of low density on top, a firm foam of high density on the bottom, and a border or side wall of foam of medium density.

In the preferred method, the third formulation is not added immediately after the addition of the first and second. It is preferred that a time delay exist which permits the first formulation to start to cream and reduce its specific gravity so that it will float on the liquid third formulation. The length of time delay required depends on the reaction rates of the foams being utilized, primarily the reaction rate of the first foam formulation. If the mass of the first formulation has increased too far in the foaming reaction, the viscosity of the mass will be such that the third formulation being added will not be able to penetrate the first formulation. On the other hand, if the foaming reaction of the first formulation mass has not advanced sufficiently, the first formulation will commingle with the third formulation and the resulting article will not exhibit the desired stratified layers of foams of different densities. In the preferred practice of the method, a time delay of 10 to 30 seconds is acceptable as the first formulation will have risen between about 10% to about 80% of its potential rise in that period and the third formulation will still pass through the first layer without detrimental effects.

The above mentioned and other objects will be apparent to those skilled in the art from the description which follows:

BRIEF DESCRIPTION OF THE DRAWINGS

FIG. 7 is an elevational view in section, taken along the line 7—7 in FIG. 6 and showing the foam process approximately halfway through.

DESCRIPTION OF THE PREFERRED EMBODIMENT

Figure 1:
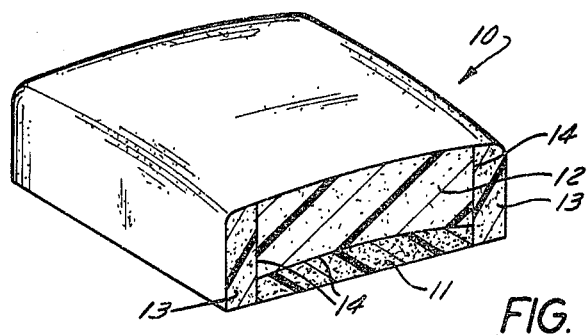
FIG. 1 is a perspective view, partially in section, of the preferred embodiment of the three part foam article of the present invention.

In FIG. 1 of the drawings is seen a three component foam article 10 suitable for use as a seat cushion. The foam article 10 is comprised of a firm, foam bottom layer 11, a soft foam top layer 12 and a border or side wall of intermediate density foam 13. The bottom 11, the top 12 and the border or side wall 13 are bonded or knitted together at their common boundaries 14.

The function of the firm foam bottom layer 11 in a cushion is to either provide the cushion with high support qualities or to provide an energy absorbing or energy insulating layer within the cushion; the function of the soft foam top layer 12 is to provide a comfortable load distributor which gives the overall cushion a soft and luxurious feel and the function of the border or side wall of medium density foam is to increase the ease of upholstery over that obtainable with a two part cushion. The foam components are bonded together along their common boundaries 14 during the curing process eliminating the need for the use of adhesives.

The method of preparing the foam article 10 will now be described in connection with FIGS. 2 to 8 of the drawings.

Figure 2:
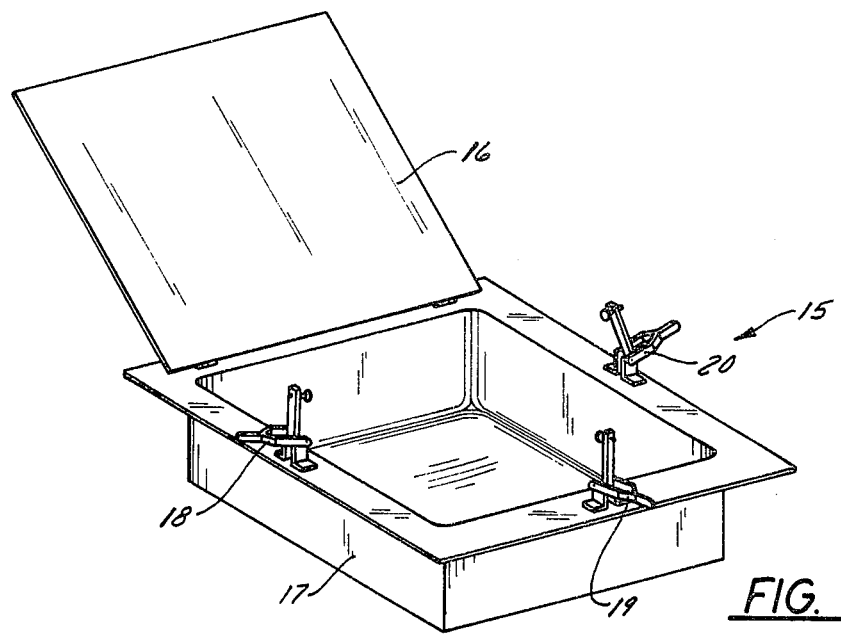
FIG. 2 is a perspective view of an open mold in which the foam article may be produced.

The foam article 10 is prepared in a mold 15 such as shown in FIG. 2 or in molds of other suitable configurations. The mold 15 includes a lid 16 and a container 17. Toggle clamps 18, 19 and 20 are provided for securing the lid 16 to the container 17. The mold 15 is preferably placed on a conveyor line (not shown) and liquid formulations for the foams poured into the mold. The formulations are then allowed to rise and cure in the closed mold to form the foamed article 10.

Figure 3:
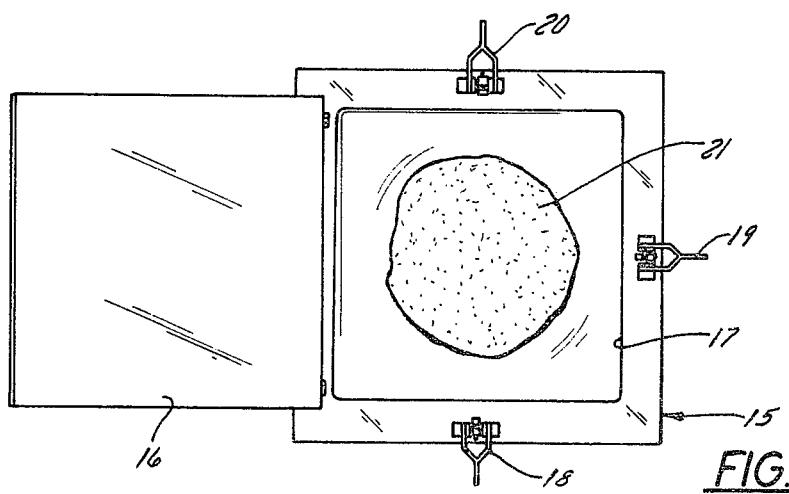
FIG. 3 is a plan view of the mold of FIG. 2 with the first formulation therein.
Figure 4:
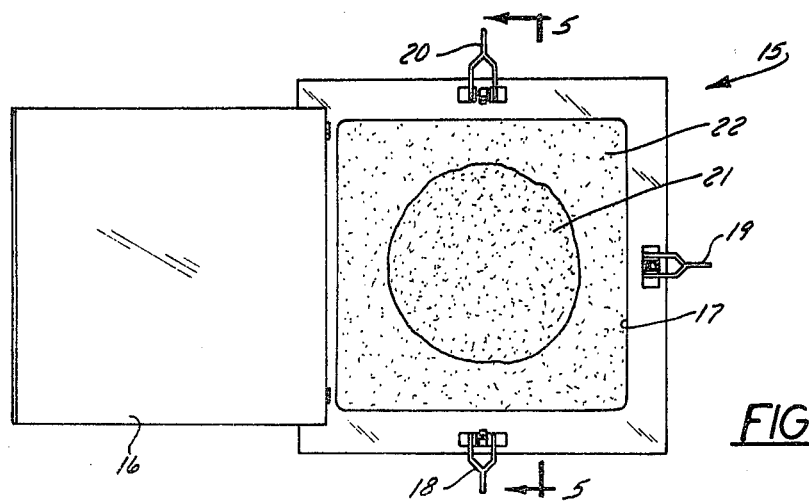
FIG. 4 is a view like FIG. 3 with both the first and second formulations therein.
Figure 5:
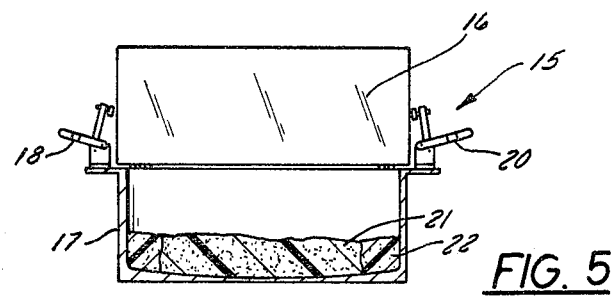
FIG. 5 is a side elevational view in section and taken along the line 5—5 in FIG. 4, and showing the foams after they have commenced to rise.
Figure 6:
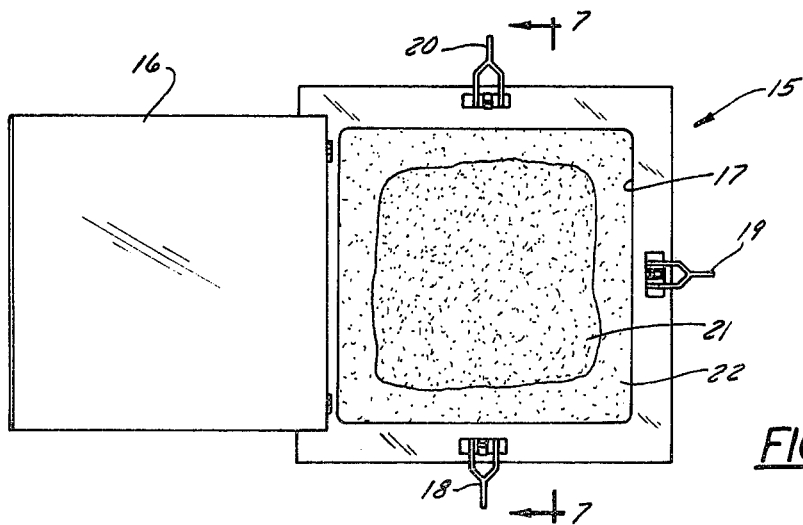
FIG. 6 is a view similar to FIG. 3, but immediately after the third formulation has been added.

In the preferred practice of the method of the present invention, a first liquid formulation 21 which will form the firm foam bottom 11 is poured into the center of the mold 14 partially covering the floor of the mold (FIGS. 2 and 3). Immediately, before the first formulation 21 creams or rises, a second liquid formulation 22 which will form the side wall 13 of intermediate density foam is poured about the periphery of the first formulation (FIG. 4). Next, after the first and second formulations have started to cream and rise and have completed about 10% to about 80% of their potential rise (FIG. 5), a third liquid formulation 23 which will form the soft foam top 12 is poured into the mold 15 upon and through the first formulation 21 (FIG. 6).

Figure 7:
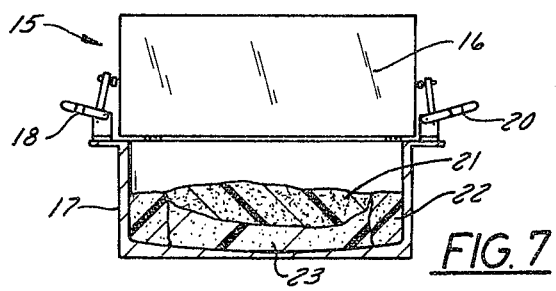
Figure 8:
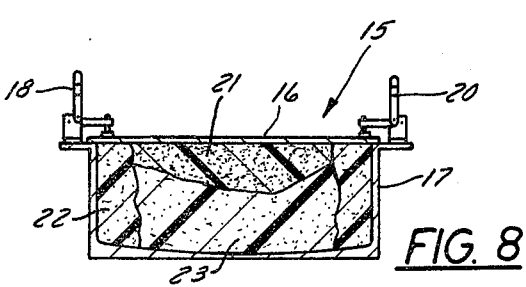
FIG. 8 is a view similar to FIG. 7, but with the lid of the mold closed and the foams having risen to fill the mold.

The first formulation 21 which is rising and foaming at the time the third formulation 23 is added has a specific gravity which is less than formulation 23. Therefore, the third formulation 23 passes through the rising first formulation 21 and the first formulation 21 floats upon the upper surface of the liquid third formulation 23 (FIG. 7). In the drawing only the first formulation 21 is shown floating on the surface of formulation 23, however, the second formulation 22 will also float on the liquid third formulation 23 if enough of the third formulation 23 is added. The mold 15 is then closed with the lid 16 and the contents permitted to rise and cure. The time required for curing ranges from between about 6 to about 10 minutes and varies with the ingredients of the formulations and the amount and type of catalyst utilized. The resulting foam article 10 is then removed from the mold and, if desired, crushed through squeeze rollers to crush closed cells and allowed to further cure. When used as a cushion, the article 10 is inverted 180° so that the soft foam layer 12 is at the top and firm layer 11 is at the bottom as seen in FIG. 1.

The firm layer 11 is preferably of a high density polyurethane foam and it has a 25% I.L.D. (indentation load deflection) or hardness of about 70 lbs. or higher; a 65% I.L.D. of about 185 lbs. or higher and a sag factor of 2.65. The soft foam layer 12 preferably has a 25% I.L.D. of about 21 lbs., a 65% I.L.D. of about 58.8 lbs. or higher and a sag factor of about 2.8. The side wall or border 13 is preferably of a foam of intermediate density which has a 25% I.L.D. of about 50 lbs, a 65% I.L.D. of 137.5 lbs. and a sag factor of 2.75. The article 10 has an overall sag factor or I.L.D. (65/25) index of between about 4.5 to about 6.5.

The following examples will further illustrate the advantages of the present invention, and provide a more complete understanding of the preferred process.

EXAMPLE 1

Multidensity Foam Article

Into the center of a 4"×15"×15" mold, there was placed 393 grams of Formulation No. 1.

| Formulation No. 1 | Grams |
|---|---|
| Polyether triol, 4800 M.W. 34.0 hydroxyl number. (NIAX Polyol 11-34) | 63.20 |
| Acrylonitrile Polymer Polyol Hydroxyl number 28, (NIAX Polyol 31-28) | 35.00 |
| Diethanolamine | 1.80 |
| Water | 2.30 |
| Tertiary amine catalyst | 1.90 |
| Non-hydrolyzable silicone surfactant (L5309) | 0.60 |
| Fluorocarbon blowing agent | 8.00 |
| Quasi Prepolymer 32% free NCO (NIAX isocyanate SF 50) | 41.70 |

Immediately thereafter, 328 grams of Formulation 2 was poured around the periphery of the Formulation 1.

| Formulation No. 2 | Grams |
|---|---|
| Polyether triol, 4800 M.W. 34.0 hydroxyl number. (NIAX Polyol 11-34) | 66.92 |
| Acrylonitrile Polymer Polyol Hydroxyl number 28, (NIAX Polyol 31-28) | 37.05 |
| Diethanolamine | 1.90 |
| Water | 2.43 |
| Tertiary amine catalyst | 2.01 |
| Non-hydrolyzable silicone surfactant (L5309) | 0.63 |
| Fluorocarbon blowing agent | 8.47 |
| Quasi Prepolymer 32% free NCO (NIAX isocyanate SF 50) | 41.70 |

Formulations No. 1 and No. 2 were then allowed to cream and rise for 30 seconds in which time they had risen to 65% of their total potential.

Next, 589 grams of Formulation No. 3 was poured into the mold directly in the center of and on top of the still rising Formulation No. 1.

| Formulation No. 3 | Grams |
|---|---|
| Polyether triol, 4800 M.W. hydroxyl number 34.0 (NIAX Polyol 11-34) | 60.00 |
| Acrylonitrile Polymer Polyol hydroxyl number 28.0. (NIAX Polyol 31-28) | 35.00 |
| Ethoxylated triethanolamine hydroxyl number 635 (Thanol SF 265) | 5.00 |
| Water | 2.50 |
| Tertiary amine catalyst | 1.35 |
| Organo-tin catalyst | 0.03 |
| Non-hydrolyzable silicone surfactant (L5309) | 1.00 |
| Fluorocarbon blowing agent | 8.00 |
| Modified poly isocyanate 40% free NCO (Mondur MT 40) | 35.16 |

Formulation No. 3 which when added was a liquid had a higher specific gravity than the creaming, rising Formulations No. 1 and passed through it. As a result, Formulation No. 1 floated on the surface of Formulation No. 3. The lid of the mold was then closed and clamped, and the contents allowed to foam, rise and cure for 10 minutes. The article was then removed from the mold, and crushed through squeeze rollers to fracture closed cells and allowed to cure at room temperature for seven days.

The resultant foam article exhibited the following load bearing properties:

| Load Indentation Deflection | |
|---|---|
| 25% Deflection | 21.0 lbs. |
| 65% Deflection | 115.0 lbs. |
| Sag Factor | 5.47 |

The ingredients of Formulations No. 1, 2 and 3 having the brand name Niax and the silicone surfactant, are available from Union Carbide. The ethoxylated triethanol amine (Thanol SF 265) is available from the Jefferson Chemical Company and the modified polyisocyanate (Mondur) is available from Mobay Chemical. The products of other manufacturers having equivalent properties and serving the same functions can be substituted.

EXAMPLE 2

For comparative purposes, foam articles were made using the procedure set forth in Example 1 except that only one formulation was used to make each article. The articles produced were characterized as follows:

| Article from Formulation No. 1 | |
|---|---|
| 930 gram sample 4" × 15" × 15" | |
| Load Indentation Deflection | |
| 25% Deflection | 70.0 lbs. |
| 65% Deflection | 185.5 lbs. |
| Sag Factor | 2.65 |
| Article from Formulation No. 2 | |
| 900 gram sample 4" × 15" × 15" | |
| Load Indentation Deflection | |
| 25% Deflection | 50.0 lbs. |
| 65% Deflection | 137.5 lbs. |
| Sag Factor | 2.75 |
| Article from Formulation No. 3 | |
| 800 gram sample 4" × 15" × 15" | |
| Load Indentation Deflection | |
| 25% Deflection | 21.0 lbs. |
| 65% Deflection | 58.8 lbs. |
| Sag Factor | 2.8 |

The foam articles produced from the individual formulations were not satisfactory for use as seat cushions since they had a sag factor of less than 3.0.

The articles prepared in the examples were judged by the appearance of the article and its appropriateness for use as a cushion, the appearance of a cross section of the article and the sag factor.

The article of Example 1 was acceptable for use as a cushion. The top of the article was covered with the soft foam layer, the side wall of the cushion was of a foam of intermediate firmness and the bottom of the cushion was a layer of firm, supportive foam. A cross section of the article indicated that there was a clear stratification of the three different density foams and a strong knitting line where the foams were joined.

The articles prepared in Example 2 were unacceptable for use as cushions. They either had inadequate sag factors, or contained unacceptable voids.

The method of determining the load indentation deflection values was that described in ASTM D 1564-63T. The sag factor or I.L.D. (65/25) index is the ratio of a 65% compression value divided by the 25% value. This ratio indicates to some extent a more or less linear relationship between ratings taken to form a resilience curve. A sag factor of 3 to 4.5 pounds is considered acceptable for a seat cushion for a snowmobile or piece of industrial equipment and a sag factor of about 4.5 to about 6.0 is considered acceptable for a passenger vehicle seat or upholstered furniture.

Although for purposes of illustration, specific formulations have been described for Formulations No. 1, No. 2 and No. 3, it will be readily understood by those skilled in the art that any foam formulations which yield foams having the desired properties when used in the method of the invention can be employed. The selection of ingredients will depend upon the function the foam layer is desired to perform. When the function of the firm foam layer is to provide high support, a high I.L.D. foam is preferred. However, if the primary function of the firm foam layer is to provide an energy absorbing layer, the formulation should be designed to yield a semi-flexible foam with a high degree of cross linking. The side wall is preferably formed of an intermediate density semi-flexible foam which provides sufficient support for the intended use. However, any foam formulation that results in a foam having a firmness greater than that of the soft foam layer and provides adequate support may be used. The soft foam layer is preferably a high resiliency low I.L.D. foam. However, any soft foam formulation which results in a soft foam layer which functions as a comfortable load distributor and gives the overall cushion a soft and luxurious feel can be employed.

Polyurethane foams are formed by the reaction of a polyol and a polyisocyanate in the presence of a blowing agent, a catalyst and surfactant. The blowing agent produces gas for foaming, the catalyst speeds the reaction and the surfactant stabilizes the rising foam and controls cell size. By varying the type and amount of these ingredients, urethane foams can be made by those skilled in the art to meet the requirements of the firm, supportive layer and soft, comfortable layer.

It will be apparent to those skilled in the art that a number of modifications may be made without departing from the spirit and scope of the invention. For example, although for purposes of illustrating the invention the preparation of an article having a continuous side wall of intermediate density foam has been described, there may be instances in which only a partial side wall may be desired. It is, therefore, to be understood that the scope of the present invention is not to be limited except by the claims which follow:

I claim:

1. A method of preparing a foam article having a top of soft foam of low density, a firm supportive bottom of foam of high density and a supportive side wall of foam of intermediate density, said method comprising:
   (a) placing a first formulation which will yield a firm foam in the center of a mold thereby partially filling said mold;
   (b) placing a second formulation which will yield a foam of intermediate density in said mold about the periphery of said first formulation thus forming a border;
   (c) permitting the first formulation to cream, foam and rise to about 10% to about 80% of its potential;
   (d) adding to the mold a third formulation which will yield a soft foam, said third formulation being liquid and having a higher specific gravity than the first formulation so that the third formulation passes through the first formulation and the first formulation will float upon the third formulation; and
   (e) allowing the three formulations to cream, foam, rise and cure to obtain a single foam article having a firm, foam layer, a soft foam layer and a border or side wall of foam of intermediate density, said layers and side wall being bonded and knitted together at their common boundaries during the curing process.

2. A process according to claim 1, wherein said firm, intermediate, and soft foams are polyurethane foams.

3. A process according to claim 1, wherein the multidensity foamed article has a sag factor ranging from about 4.5 to about 6.5.

4. An article suitable for use as a cushion which includes a firm foam top layer, a soft foam bottom layer and a border or side wall of foam of intermediate density, said layers and side wall being bonded and knitted together along their common boundaries without the use of adhesives.

5. A foam article of claim 4 which has a sag factor of about 4.5 to about 6.5.

6. A foam article of claim 4 in which the firm layer is of crosslinked polyurethane foam.

7. A multidensity foam article made by the method of claim 1 and suitable for use as a seat cushion which includes a firm foam layer, a soft foam layer and a border or side wall of foam of intermediate density, said layers being bonded and knitted together along their common boundary without the use of adhesive.

* * * * *